United States Patent [19]

Santa et al.

[11] Patent Number: 5,274,071
[45] Date of Patent: Dec. 28, 1993

[54] WHOLLY AROMATIC POLYAMIDE

[75] Inventors: Toshihiro Santa; Tsutomu Kiriyama, both of Ehime, Japan

[73] Assignee: Teijin Limited, Osaka, Japan

[21] Appl. No.: 649,575

[22] Filed: Feb. 1, 1991

[30] Foreign Application Priority Data

Feb. 9, 1990 [JP] Japan ................................. 2-28395

[51] Int. Cl.⁵ .......................... C08G 69/32; C08G 69/12
[52] U.S. Cl. .................................. 528/329.1; 528/179;
528/183; 528/222; 528/229; 528/331; 528/336;
528/338; 528/348; 428/474.4
[58] Field of Search ............ 528/183, 179, 229, 329.1,
528/336, 331, 222, 348, 338; 428/474.4

[56] References Cited

U.S. PATENT DOCUMENTS

| | | | |
|---|---|---|---|
| 3,380,969 | 4/1968 | Hill | 528/331 |
| 3,386,965 | 6/1968 | Huffman | 528/331 |
| 4,720,538 | 1/1988 | Bartmann | 528/336 |
| 4,721,772 | 1/1988 | Ueno et al. | 528/336 |
| 4,831,104 | 5/1989 | Aya | 528/125 |
| 4,910,282 | 3/1990 | Abraham | 528/331 |
| 4,987,215 | 1/1991 | Keil | 528/331 |
| 4,987,216 | 1/1991 | Keil | 528/331 |
| 5,026,819 | 6/1991 | Irwin | 528/331 |
| 5,039,785 | 8/1991 | Irwin | 528/331 |
| 5,077,125 | 12/1991 | Croman | 528/331 |
| 5,093,464 | 3/1992 | Yoon | 528/331 |

FOREIGN PATENT DOCUMENTS 0099997 2/1984 European Pat. Off.
0213286 3/1987 European Pat. Off.

*Primary Examiner*—John Kight, III
*Assistant Examiner*—P. Hampton-Hightower
*Attorney, Agent, or Firm*—Burgess, Ryan & Wayne

[57] ABSTRACT

A wholly aromatic polyamide capable of being dissolved in organic solvents to form an isotropic dope solution and having an excellent chemical resistance, heat resistance, processability and mechanical strength and a high modulus, comprises recurring aromatic dicarbonyl units of the formulae:

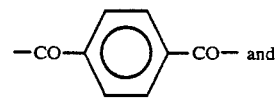

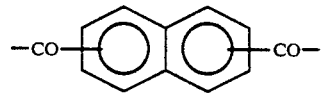

and recurring aromatic diamine units of the formulae:

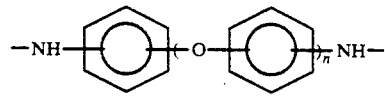

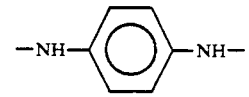

and

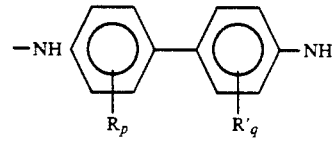

wherein R and R' are a hydrogen or halogen atom or an alkyl or alkoxyl radical, n is 1 to 3, and p and q are 1 to 4.

7 Claims, No Drawings

WHOLLY AROMATIC POLYAMIDE

BACKGROUND OF THE INVENTION

1) Field of the Invention

The present invention relates to a wholly aromatic polyamide. More particularly, the present invention relates to a wholly aromatic polyamide having a high modulus, mechanical strength, heat resistance, chemical resistance and processability and able to be dissolved in an organic solvent.

2) Description of the Related Art

It is known that wholly aromatic polyamide (aramid) materials are widely utilized as a high heat-resistant, high performance resinous material, for producing fibers, filaments, films and sheets. Briefly, the wholly aromatic polyamide are classified into two groups, i.e., a liquid crystal type aramid group and an isotropic aramid group.

The poly-p-phenylene terephthalamide is a typical liquid crystal type aramid and can be dissolved in sulfuric acid to form a liquid crystal dope solution for producing aramid fibers. These liquid crystal type aramids exhibit a high mechanical strength, and thus are widely used in various fields.

Nevertheless, the conventional liquid crystal type aramids are disadvantageous in that they must be shaped in the state of a liquid crystal dope solution, and in a polymerization process thereof, a specific polymerization medium must be used. Also, when spun, the resultant aramid fibers have a mechanical strength which is not always satisfactorily high, a poor ultimate elongation, and an unsatisfactory toughness (tenacity).

Several attempts have been made to improve the physical properties of aramid fibers. For example, Japanese Unexamined Patent Publication Nos. 62-263,320 and 63-75,111 discloses a process for producing aramide fibers comprising an improved aramid polymer which contains, as an additional component, 2,6-naphthalene units which are effective for decreasing the crystallizing property of the aramid polymer, and thus for enhancing the mechanical strength of the resultant aramid fibers.

These attempts, however, are disadvantageous in that the resultant aramid polymer exhibits a lower heat resistance and an unsatisfactory mechanical strength, and must be dissolved in a limited solvent, and the resultant solution exhibits a liquid crystal property, and thus must be shaped into a shaped articles, for example, a fiber, by a liquid crystal-shaping method, for example, a liquid crystal spinning method.

The isotropic aramids can be dissolved in an organic solvent to provide an isotropic dope solution which is usable for producing a shaped article, for example, a fiber, by a direct wet shaping method, for example, a direct wet spinning method.

In this direct wet shaping method, an aramid polymer solution obtained from a polymerization process thereof can be directly subjected to a shaping process without recovering the aramid polymer from the solution and dissolving it in sulfuric acid, and thus has a high processability.

As mentioned in, for example, Japanese Examined Patent Publication No. 53-32838 and Japanese Unexamined Patent Publication Nos. 61-252,229 and 1-204,930, in the isotropic aramid polymer, an additional group, for example, an ether group and/or a m-aromatic group, is introduced into the poly-p-phenylene terephthalic amide structure to increase a solubility of the polymer.

The introduction of the additional group is disadvantageous in that the resultant aramid polymer exhibits a lower modulus and heat resistance and an unsatisfactory mechanical strength.

SUMMARY OF THE INVENTION

An object of the present invention is to provide a wholly aromatic polyamide having a high modulus, a high ultimate elongation, and an enhanced processability and able to be dissolved in an organic solvent to form a dope solution useful for producing a shaped article, for example, a fiber, by a direct wet shaping method, for example, a direct wet spinning method.

The above-mentioned object can be attained by the wholly aromatic polyamide of the present invention which comprises (A) recurring aromatic dicarbonyl units of the formulae (Ia) and (Ib):

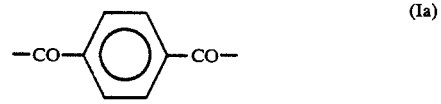

(Ia)

and

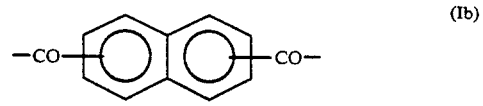

(Ib)

(B) recurring aromatic diamine units of the formulae (IIa), (IIb) and (IIc):

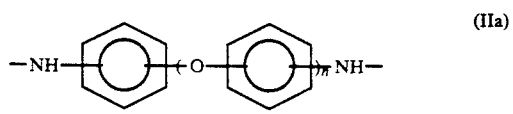

(IIa)

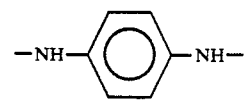

(IIb)

and

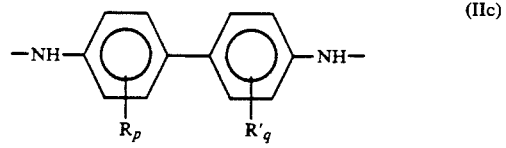

(IIc)

in which formulae, R and R' respectively represent, independently from each other, a member selected from the group consisting of hydrogen and halogen atoms and alkyl and alkoxyl radicals, n represents a positive integer of 1 to 3, and p and q respectively and independently from each other represent a positive integer of 1 to 4.

DESCRIPTION OF THE PREFERRED EMBODIMENTS

The wholly aromatic polyamide of the present invention comprises (A) recurring aromatic dicarbonyl units and (B) recurring aromatic diamine units which units (A) and (B) are in substantially equal molar amounts to each other.

The recurring aromatic dicarbonyl units (A) are of the formulae (Ia) and (Ib):

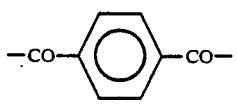  (Ia)

and

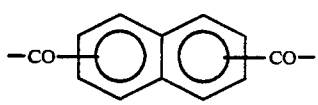  (Ib)

The dicarbonyl units of the formula (Ia) are derived from terephthalic acid halide molecules polycondensed with aromatic diamine molecules.

The dicarbonyl units of the formula (Ib) having a divalent naphthalene structure are derived from, for example, 2,6-naphthalene dicarboxylic acid halide, 2,7-naphthalene dicarboxylic acid halide, 1,5-naphthalene dicarboxylic acid halide and 1,4-naphthalene dicarboxylic acid halide molecules polycondensed with aromatic diamine molecules.

Preferably, the dicarbonyl units of the formula (Ib) are selected from those of the formulae (Ib-1), (Ib-2) and (Ib-3):

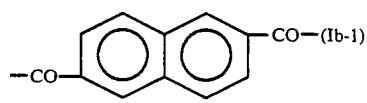  (Ib-1)

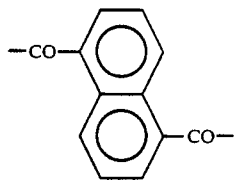  (Ib-2)

and

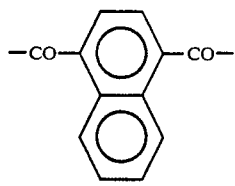  (Ib-3)

in which formulae the carbonyl radicals extend in parallel to or coaxially with each other from the naphthalene structure.

The most preferable dicarbonyl units of the formula (Ib) are of the formula (Ib-1) which are derived from 2,6-naphthalene dicarboxylic acid chloride.

The recurring aromatic diamine units (B) are of the formulae (IIa), (IIb) and (IIc);

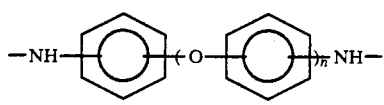  (IIa)

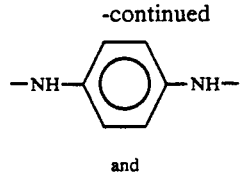  (IIb)

and

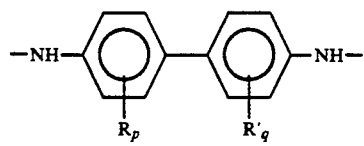  (IIc)

wherein R, R', n, p and q are as defined above.

The recurring diamine units (IIa) are derived from aromatic diaminoether compounds polycondensed with aromatic dicarboxylic acid halides.

The aromatic diaminoether compounds are preferably selected from
3,4'-diaminodiphenylether,
1,4-bis(4-aminophenoxy)phenylene,
4,4'-diaminodiphenylether,
1,4-bis(3-aminophenoxy)phenylene,
1,3-bis(4-aminophenoxy)phenylene,
3,3'-diaminodiphenylether,
4,4'-bis(4-aminophenoxy)diphenylether, and
4,4'-bis(3-aminophenoxy)diphenylether.

Preferably, the diamine units of the formula (IIa) are selected from those of the formulae (IIa-1), (IIa-2), (IIa-3) and (IIa-4):

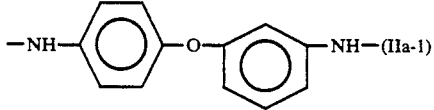  (IIa-1)

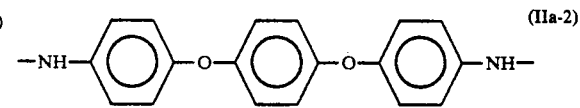  (IIa-2)

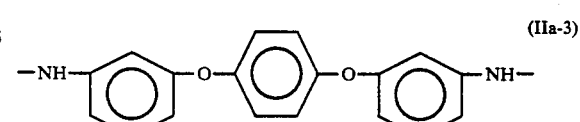  (IIa-3)

and

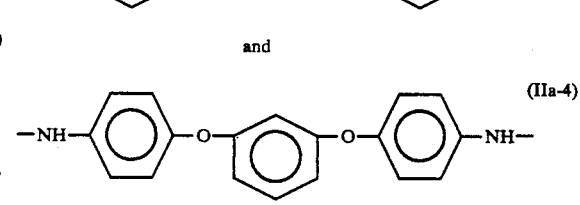  (IIa-4)

in which the -NH- groups extend in parallel to each other.

The diamine units of the formula (IIb) is derived from p-phenylenediamine polycondensed with aromatic dicarboxylic acid halides.

The diamine units of the formula (IIc) are derived from substituted or unsubstituted benzidine compounds polycondensed with aromatic dicarboxylic acid halides.

The benzidine compounds are preferably selected from benzidine, 3,3'-dimethylbenzidine, 3,3',5,5'-tetramethylbenzidine, 3,3'-dichloro-benzidine, 2,2'-dimethylbenzidine, 3,3'-dimethoxybenzidine, 2,2'-dimethoxybenzidine and 2,2',3,3'-tetrachlorobenzidine.

In the aromatic polyamide of the present invention, the above-mentioned aromatic dicarbonyl units of the formulae (Ia) and (Ib) and aromatic diamine units of the formulae (IIa), (IIb) and (IIc) are present in copolymerizing proportions or molar fractions suitable for causing the resultant copolymer to exhibit a satisfactory solubility in an organic polar solvent.

The organic polar solvent preferable comprises at least one member selected from N-methylpyrrolidone, dimethylacetamide, dimethylsulfone, dimethylformamide, N-methylcaprolactam, tetramethylurea, and N,N,-dimethyl-2-imidazolidinone. Optionally, the organic polar solvent contains an inorganic additive comprising at least one member selected from, for example, hydrogen chloride and halogenated metal compounds such as lithium chloride, calcium chloride and potassium chloride, which effectively enhance the solubility of the solvents.

In the wholly aromatic polyamide of the present invention, preferably the recurring aromatic dicarbonyl units of the formulae (Ia) and (Ib) are in the molar amounts satisfying the following relationship:

$$0.00123 \ (M_{Ib})/[(M_{Ia})+(M_{Ib})] \leq 0.7$$

wherein $(M_{Ia})$ and $(M_{Ib})$ represent molar amounts of the recurring units of the formulae (Ia) and (Ib), respectively.

More preferably, the ratio $(M_{Ib})/[(M_{Ia})+(M_{Ib})]$ is from 0.01 to 0.50, still more preferably from 0.05 to 0.30.

When the ratio $(M_{Ib})/[(M_{Ia})+(M_{Ib})]$ falls outside of the range of from 0.001 to 0.7, the resultant wholly aromatic polyamide sometimes exhibits an unsatisfactory mechanical strength and formability, for example, fiber-forming property.

Therefore, to obtain the wholly aromatic polyamide of the present invention having a satisfactory mechanical strength and formability, preferably the ratio $(M_{Ib})/[(M_{Ia})+(M_{Ib})]$ is controlled to the limited range of from 0.001 to 0.70.

There is no restriction of the molar proportion of the recurring aromatic diamine units of the formulae (IIa), (IIb) and (IIc), as long as the resultant aromatic polyamide has a satisfactory solubility in the organic polar solvents. Nevertheless, preferably the molar proportions of the recurring aromatic diamine units of the formulae (IIb) and (IIc), which units form rigid and stiff segments in the resultant polyamide copolymeric molecules, are as large as possible.

The processes for producing the wholly aromatic polyamide of the present invention are as follows. In generally, the aramid polymers can be produced by a solution polymerization method, interface polymerization method, direct polymerization method or isocyanate method, and the wholly aromatic polyamide of the present invention can be prepared by any of the above-mentioned methods, but preferably is prepared by the solution polymerization method.

In this solution polymerization method, an aromatic dicarboxylic acid halide component is reacted and polymerized with an aromatic diamine component by a de-hydrogenchloride reaction. Usually, the reaction rate of this reaction is very high. Therefore, to control the reaction rate to a reduced level, the polymerization reaction is preferably carried out at a relatively low temperature, for example, from −20° C. to 100° C., preferably 5° to 80 ° C.

The polymerization medium comprises at least one organic polar solvent as mentioned above, and optionally, contains a metal chloride as a dissolving assistant.

The content of the resultant polymer in the polymerization reaction mixture varies and depends on the solubility of the resultant polymer in the polymerization medium and the viscosity of the resultant polymer solution, and preferably is 10% by weight or less but not less than 1%.

If the content of the polymer is less than 1% by weight, the resultant polymer solution sometimes exhibits an unsatisfactory productivity and formability, for example, fiber-forming property.

The content of the polymer in the polymer solution obtained from the polymerization reaction should be adjusted in general consideration of the types of the polymerization components, the composition and solubility of the resultant polymer, the viscosity of the resultant polymer solution, and the facility when handling and deforming of the polymer solution. Preferably, the total concentration of the polymerization components in the polymerization mixture is controlled to an extent such that the content of the resultant polymer results in a level of from 2% by weight or more, more preferably about 6% by weight.

In the polymerization procedure, an aromatic diamine component is dissolved in an organic solvent at a low temperature, for example, 5° to 30 ° C., then the resultant solution is supplemented with an aromatic dicarboxylic acid halide component, in an inert gas atmosphere, for example, a nitrogen gas atmosphere, which atmosphere effectively prevents an undesirable deterioration of the aromatic diamine compounds.

The aromatic dicarboxylic acid halide component is used usually in an molar amount substantially equal to that of the aromatic diamine component. Nevertheless, if it is necessary to control the polymerization reaction rate, one of the dicarboxylic acid halide component or the diamine component is employed in a larger molar amount than the other.

Also, the polymerization mixture optionally contains a monofunctional organic compound, for example, monoamino compound, for example, aniline or naphthyl monoamine, and nonocarboxylic acid compound, for example, acetic acid chloride or benzoyl chloride.

In the preparation of the wholly aromatic polyamide of the present invention, the polymeric structure and sequence of the recurring units in the polymeric structure can be changed by reacting a portion of the dicarboxylic acid halide component or the diamine component with the diamine component or the dicarboxylic acid halide component, and then adding the remaining portion of the dicarboxylic acid halide component or the diamine component to the polymerization mixture. In this method, the resultant polymer contains polymeric block segments.

The resultant polymerization mixture contains a by-product consisting of hydrogen halide, and thus should be neutralized by adding a neutralizing agent thereto. There is no limitation on the type of the neutralizing agent, as long as the neutralizing agent comprises a basic substance preferably selected from lithium hydroxide, sodium hydroxide, potassium hydroxide, magnesium hydroxide, calcium hydroxide, magnesium oxide, calcium oxide, triethylamine, tripropylamine, benzyl-dimethylamine and tetraethyl ammonium salts.

From the point of view of economy, the preferable basic compounds are calcium oxide and calcium hydroxide.

In the neutralization procedure, the neutralizing agent in the form of a powder can be added to the polymerization mixture. Preferably, the neutralizing agent in the form of a powder is suspended in an organic solvent, and the resultant slurry is added to the polymerization mixture. This manner of addition of the neutralizing agent effectively enables an easy control of the neutralizing reaction.

The neutralized polymer solution can be directly supplied to a desired shaping process, for example, a wet jet spinning process or a wet film-forming process.

In this shaping process, a shaped polymer solution stream is coagulated in a coagulating liquid which preferably consists of a mixture of the same organic polar solvent as that employed in the polymerization procedure, with water.

Also, the polymer solution can be converted to an aramid pulp by pouring the polymer solution into a coagulating liquid having a poor solubility for the polymer, for example, water or methyl alcohol.

The polymer solution may be a mixture of two or more type of polymer solutions prepared separately from each other or a solution of two or more types of polymers prepared independently from each other, as long as the resultant polymer mixture meets the requirements of the present invention, and preferably, exhibits an isotropic property.

The wholly aromatic polyamide of the present invention exhibits a high mechanical strength and modulus. The recurring diamine units having a p-phenylene structure and a benzidine structure contribute to an enhancing of the modulus and mechanical strength of the resultant polyamide. Also, the recurring diamine units having at least one diphenyl ether structure effectively increase the solubility in the organic polar solvent. Further, the recurring dicarbonyl units having a naphthalene structure very effectively enhance a drawability of the resultant polymer, and thus increase the mechanical strength and ultimate elongation of the resultant shaped article.

When the recurring diamine units of the formula (IIc) have halogen atoms attached to the benzidine structure, the resultant polyamide exhibits an enhanced flame-retarding property or anti-flame property, in addition to the above-mentioned properties. Also, this type of polyamide has an enhanced dimensional stability and an excellent tenacity, toughness and fatigue resistance, due to the increase in the stretchability thereof.

In a preferable embodiment of the present invention, the recurring aromatic dicarbonyl units are those of the formulae (Ia) and (Ib-1);

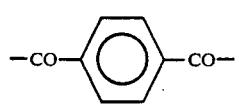

(Ia)

and

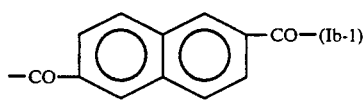

(Ib-1)

and the recurring aromatic diamine units are those of the formulae (IIa-1) (IIb) and (IIc-1):

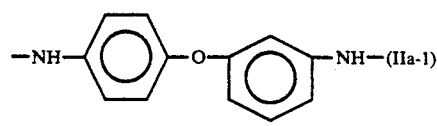

(IIa-1)

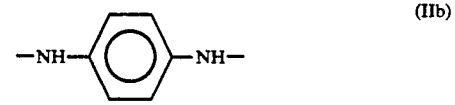

(IIb)

and

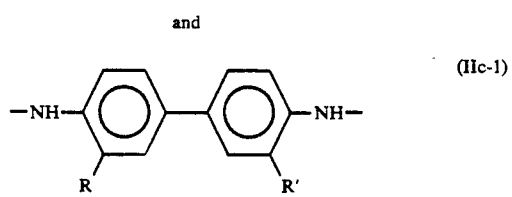

(IIc-1)

wherein R and R' are same as each other and respectively represent a member selected from the group consisting of halogen atoms and alkyl radicals. In this embodiment, the recurring units of the formulae (Ia) and (IIb-1) are preferably in the molar amounts satisfying the following relationship:

$$0.01 \leq (M_{Ib\text{-}1})/[(M_{Ia}) + (M_{Ib\text{-}1})] \leq 0.6$$

wherein $(M_{Ia})$ is as defined above, and $(M_{Ib\text{-}1})$ represents a molar amount of the recurring units of the formula (Ib-1).

The wholly aromatic polyamide of the present invention is usually employed in the form of a dope solution in which the polyamide is dissolved in an organic solvent.

The wholly aromatic polyamide of the present invention is useful for producing shaped aramid articles, for example, fibers, films and pulp, having a high mechanical strength and modulus. Those aramid shaped articles are useful for producing tire cords, belts, ropes, tension members, bulletproof jackets, edgeproof wear, substitute for asbestos and other industrial materials.

The present invention will be further explained by the following specific examples, which are representative and do not restrict the scope of the present invention.

In the examples, the following abbreviations are used.
3,3'-DMB : 3,3'-dimethylbenzidine
3,3'-DCB : 3,3'-dichlorobenzidine
PPDA : p-phenylenediamine
3,4'-DAPE : 3,4'-diaminodiphenylether
TPC : terephthalic acid chloride
2,6-NDC : 2,6-naphthalene dicarboxylic acid chloride Also, the following measurements were carried out.

Intrinsic Viscosity ($\zeta$inc)

A dry polymer in an amount of 0.5 g was dissolved in 100 ml of a 98% sulfuric acid, and the resultant solution was subjected to a viscosity measurement at a temperature of 30° C.

Solution Viscosity

A polymer solution was subjected to a viscosity measurement at a predetermined temperature, by a falling ball test method.

EXAMPLE 1

(3,3'-DMB/PPDA/3,4'-DAPE=40/30/30,
2,6-NDC/TPC=10/90)

Preparation Of Polymer

A thoroughly dried three-necked flask was charged with 1892.9 parts by weight of a dried and dehydrated N-methyl-pyrrolidone (NMP). Thereafter, 13.6604 parts by weight of PPDA, 25.2947 parts by weight of 3,4'-DAPE and 35.7571 parts by weight of 3,3'-DMB were placed in the flask in a nitrogen gas atmosphere and dissolved in the NMP while uniformly stirring same.

The resultant solution in the flask was mixed with 76.9413 parts by weight of TPC and 10.6573 parts by weight of 2,6-NDC at room temperature, while stirring at a high speed, and the resultant mixture was subjected to a polymerization reaction at room temperature in a nitrogen gas stream for 3 hours while stirring, heated to a temperature of 80° C., and maintained at this temperature for one hour.

Accordingly, a light yellow-colored transparent polymer solution was obtained.

The dope polymer solution was neutralized by adding 138.25 parts by weight of a slurry containing 22.5% by weight of calcium hydroxide dispersed in NMP thereinto, while evenly stirring, and the resultant dope solution exhibited a solution viscosity of 5598 poises at a temperature of 120° C.

The resulting polymer was recovered by a deposition method in water. This polyamide polymer exhibited an intrinsic viscosity ($\zeta$inh) of 4.55 determined by the above-mentioned sulfuric acid method.

Wet Spinning

The dope solution was placed in a spinning cylinder provided with 25 spinning orifices having an inside diameter of 0.3 mm, degassed at a temperature of 120° C., and then extruded through the spinning orifices by using a piston, and the extruded filamentary dope solution streams were introduced into a coagulating liquid consisting of an aqueous solution of 30% of weight of NMP through a 10 mm air gap at a temperature of 50° C.

The coagulated filaments were withdrawn from the coagulating liquid at a take up speed of 12.5 m/min, washed with water, and dried at a temperature of 110° C.

The resultant undrawn filaments was drawn at a first drawing step at a temperature of 300° C. at a first draw ratio of 3.2, and then at a second drawing step at a temperature of 460° C., 470° C. or 480° C. at a draw ratio which made the total draw ratio (TDR) become the value shown in Table 1.

The resultant filaments had the denier, tensile strength, ultimate elongation and Young's modulus indicated in Table 1.

It was confirmed that all of the drawn polyamide filaments had a high tensile strength of more than 30 g/d. and a Young's modulus of more than 800 g/d.

TABLE 1

(Example 1)

| Run No. | Polymerized components (molar %) | | | | | Intrinsic viscosity | Second drawing temperature (°C.) | Total draw ratio | Filament | | | |
|---|---|---|---|---|---|---|---|---|---|---|---|---|
| | Diamine compound | | | Dicarboxylic acid compound | | | | | Denier | Tensile strength (g/d) | Ultimate elongation (%) | Young's modulus (g/d) |
| | 3,3'-DMB | PPDA | 3,4'-DAPE | 2,6-NDC | TPC | | | | | | | |
| 1 | 40 | 30 | 30 | 10 | 90 | 4.55 | 460 | 12.1 | 62 | 31.6 | 3.8 | 806 |
| 2 | 40 | 30 | 30 | 10 | 90 | 4.55 | 470 | 16.0 | 51 | 34.3 | 4.0 | 930 |
| 3 | 40 | 30 | 30 | 10 | 90 | 4.55 | 480 | 23.0 | 33 | 34.2 | 4.0 | 870 |

EXAMPLE 2

(3,3'-DMB/PPDA/3,4'-DAPE=60/20/20, 2,6-NDC/TPC=10/90)

The same procedures as in Example 1 were carried out, with the following exceptions.

The aromatic diamine component consisting of 33.3742 parts by weight of 3,3'-DMB, 10.4929 parts by weight of 3,4'-DAPE and 5.6667 parts by weight of PPDA was evenly dissolved in 1933.34 parts by weight of NMP. The molar ratio 3,3'-DMB/PPD/3,4'-DAPE was 60/20/20.

The solution was supplemented with 6.6314 parts by weight of 2,6'-NDC and 47.8759 parts by weight of TPC. The molar ratio 2,6-NDC/TPC was 10/90.

The resultant polymerization mixture was heated from room temperature to 80° C. over a time of 4 hours, and maintained at 80° C. for one hour.

The resultant polymer solution was neutralized with 86.017 parts by weight of the same neutralizing calcium hydroxide slurry in NMP as in Example 1. The resultant polyamide had an intrinsic viscosity of 6.41.

The resultant dope solution was subjected to the same drawn filament-producing procedures as in Example 1, except that the second drawing temperature and total draw ratio were as indicated in Table 2.

The properties of the resultant drawn filaments are indicated in Table 2.

TABLE 2

(Example 2)

| Run No. | Polymerized components (molar %) | | | | | Intrinsic viscosity | Second drawing temperature (°C.) | Total draw ratio | Filament | | | |
|---|---|---|---|---|---|---|---|---|---|---|---|---|
| | Diamine compound | | | Dicarboxylic acid compound | | | | | Denier | Tensile strength (g/d) | Ultimate elongation (%) | Young's modulus (g/d) |
| | 3,3'-DMB | PPDA | 3,4'-DAPE | 2,6-NDC | TPC | | | | | | | |
| 4 | 60 | 20 | 20 | 10 | 90 | 6.41 | 460 | 8.6 | 55 | 29.1 | 3.6 | 900 |
| 5 | 60 | 20 | 20 | 10 | 90 | 6.41 | 480 | 9.8 | 54 | 28.0 | 3.5 | 840 |
| 6 | 60 | 20 | 20 | 10 | 90 | 6.41 | 500 | 11.5 | 30 | 30.3 | 3.2 | 1050 |

EXAMPLE 3

(3,3'-DMB/PPDA/3,4'-DAPE=20/40/40, 2,6-NDC/TPC=10/90)

The same procedures as mentioned in Example 1 were carried out, with the following exceptions.

The copolymerized compounds were in the molar proportions indicated in Table 3.

The resultant polymer had an intrinsic viscosity of 3.82.

In the drawn filament-producing procedures, the second drawing temperature and the total draw ratio were as indicated in Table 3.

The properties of the resultant drawn filaments are also indicated in Table 3.

The dope solution was placed in the same spinning cylinder as mentioned in Example 1, degassed at a temperature of 120° C., and deformed under a pressure. Then, the dope solution was subjected to the same spinning and drawing procedures as mentioned in Example 1, except that the second drawing temperature was 400° C., 420° C. or 430° C. and the total draw ratio was controlled to the value indicated in Table 4.

The properties of the resultant filaments are shown in Table 4. Namely, the resultant filaments exhibited an excellent tensile strength and Young's modulus, and a

TABLE 3

(Example 3)

| Run No. | Polymerized components (molar %) | | | | | Intrinsic viscosity | Second drawing temperature (°C.) | Total draw ratio | Filament | | | |
|---|---|---|---|---|---|---|---|---|---|---|---|---|
| | Diamine compound | | | Dicarboxylic acid compound | | | | | Denier | Tensile strength (g/d) | Ultimate elongation (%) | Young's modulus (g/d) |
| | 3,3'-DMB | PPDA | 3,4'-DAPE | 2,6-NDC | TPC | | | | | | | |
| 7 | 20 | 40 | 40 | 10 | 90 | 3.82 | 480 | 20.0 | 45 | 32.4 | 4.4 | 750 |
| 8 | 20 | 40 | 40 | 10 | 90 | 3.82 | 490 | 24.9 | 47 | 29.8 | 4.2 | 665 |
| 9 | 20 | 40 | 40 | 10 | 90 | 3.82 | 500 | 27.4 | 42 | 27.4 | 4.1 | 715 |

The resultant polyamide exhibited an excellent fiber-satisfactory ultimate elongation.

TABLE 4

(Example 4)

| Run No. | Polymerized components (molar %) | | | | | Intrinsic viscosity | Second drawing temperature (°C.) | Total draw ratio | Filament | | | |
|---|---|---|---|---|---|---|---|---|---|---|---|---|
| | Diamine compound | | | Dicarboxylic acid compound | | | | | Denier | Tensile strength (g/d) | Ultimate elongation (%) | Young's modulus (g/d) |
| | 3,3'-DCB | PPDA | 3,4'-DAPE | 2,6-NDC | TPC | | | | | | | |
| 10 | 40 | 30 | 30 | 10 | 90 | 4.96 | 400 | 9.2 | 89 | 28.5 | 4.2 | 700 |
| 11 | 40 | 30 | 30 | 10 | 90 | 4.96 | 420 | 14.8 | 57 | 31.6 | 4.2 | 750 |
| 12 | 40 | 30 | 30 | 10 | 90 | 4.96 | 430 | 18.5 | 40 | 31.8 | 4.2 | 780 | forming property and the resultant filaments had a superior mechanical strength and modulus.

EXAMPLE 4

(3,3'-DCB/PPDA/3,4'-DAPE=40/30/30, 2,6-NDC/TPC=10/90)

The same procedures as in Example 1 were carried out, with the following exceptions.

The 3,3'-DMB was replaced by 3,3'-DCB (3,3-dichlorobenzidine).

The polymerization mixture was prepared by dissolving 26.1424 parts by weight of 3,3'-DCB, 8.3759 parts by weight of PPDA, 15.5094 parts by weight of 3,4'-DAPE in 1934.11 parts by weight of NMP while stirring, and then supplementing the resultant solution with 6.5345 parts by weight of 2,6-NDC and 47.1764 parts by weight of TPC.

The resultant polymerization mixture was heated from room temperature to 80° C. over a time of 4 hours, and maintained at this temperature for one hour, to provide a yellowish white-colored viscous and transparent polymer solution.

The polymer solution was neutralized with 85.016 parts by weight of the same 22.5 weight % calcium hydroxide slurry in NMP as in Example 1.

The resultant dope solution had a solution viscosity of 1753 poises at a temperature of 120° C., and the resultant polymer had an intrinsic viscosity of 4.96.

EXAMPLE 5

(3,3'-DCB/PPDA/3,4'-DAPE=40/30/30, 2,6-NDC/TPC=20/80)

The same procedures as mentioned in Example 4 were carried out, with the following exceptions.

The molar ratio 2,6-NDC/TPC was 20:80.

The polymerization mixture was prepared by dissolving 25.7430 parts by weight of 3,3'-DCB, 8.2479 parts by weight of PPDA, 15,2724 parts by weight of 3,4'-DAPE in 1935.12 parts by weight of NMP, and then supplementing the resultant solution with 12.8694 parts by weight of 2,6-NDC and 41.2941 parts by weight of TPC.

The same neutralizing slurry as mentioned in Example 1 were used in an amount of 83.717 parts by weight.

In the resultant dope solution, the polymer exhibited an intrinsic viscosity of 4.41.

In the drawing operation, the second drawing temperature and the total draw ratio were as shown in Table 5.

The properties of the resultant filaments were as indicated in Table 5.

Due to a relatively large content of 2,6-NDC, the second drawing operation could be carried out at a relatively low temperature. The resultant filaments had a satisfactory tensile strength.

TABLE 5
(Example 5)

| Run No. | Polymerized components (molar %) | | | | | Intrinsic viscosity | Second drawing temperature (°C.) | Total draw ratio | Filament | | | |
|---|---|---|---|---|---|---|---|---|---|---|---|---|
| | Diamine compound | | | Dicarboxylic acid compound | | | | | Denier | Tensile strength (g/d) | Ultimate elongation (%) | Young's modulus (g/d) |
| | 3,3'-DCB | PPDA | 3,4'-DAPE | 2,6-NDC | TPC | | | | | | | |
| 13 | 40 | 30 | 30 | 10 | 80 | 4.41 | 360 | 11.3 | 74 | 26.1 | 4.0 | 690 |
| 14 | 40 | 30 | 30 | 20 | 80 | 4.41 | 380 | 22.6 | 38 | 29.0 | 4.1 | 740 |
| 15 | 40 | 30 | 30 | 20 | 80 | 4.41 | 400 | 19.4 | 43 | 28.6 | 4.2 | 760 |

EXAMPLE 6

(3,3'-DCB/PPDA/3,4'-DAPE=20/40/40, 2,6-NDC/TPC=5/95)

The same procedures as mentioned in Example 4 were carried out, with the following exceptions.

The molar ratio 2,6-NDC/TPC was 5:95.

The polymerization mixture was prepared by dissolving 21.7449 parts by weight of 3,3'-DCB, 13.5789 parts by weight of PPDA, 34.4020 parts by weight of 3,4'-DAPE in 1890.39 parts by weight of NMP, and then supplementing the resultant solution with 5.4355 parts by weight of 2,6-NDC and 82.8433 parts by weight of TPC.

The same neutralizing slurry as mentioned in Example 1 was used in an amount of 141.433 parts by weight.

In the resultant dope solution, the polymer exhibited an intrinsic viscosity of 4.01.

In the drawing operation, the second drawing temperature and the total draw ratio were as shown in Table 6.

The properties of the resultant filaments were as indicated in Table 6.

The resultant filaments had a high heat resistance.

TABLE 6
(Example 6)

| Run No. | Polymerized components (molar %) | | | | | Intrinsic viscosity | Second drawing temperature (°C.) | Total draw ratio | Filament | | | |
|---|---|---|---|---|---|---|---|---|---|---|---|---|
| | Diamine compound | | | Dicarboxylic acid compound | | | | | Denier | Tensile strength (g/d) | Ultimate elongation (%) | Young's modulus (g/d) |
| | 3,3'-DCB | PPDA | 3,4'-DAPE | 2,6-NDC | TPC | | | | | | | |
| 16 | 20 | 40 | 40 | 5 | 95 | 4.01 | 480 | 16.0 | 58 | 28.5 | 4.1 | 730 |
| 17 | 20 | 40 | 40 | 5 | 95 | 4.01 | 500 | 24.0 | 38 | 28.4 | 4.0 | 710 |
| 18 | 20 | 40 | 40 | 5 | 95 | 4.01 | 520 | 24.4 | 35 | 28.6 | 3.8 | 720 |

EXAMPLE 7

(3,3'-DCB/PPDA/3,4-DAPE=20/40/40, 2,6-NDC/TPC=10/90)

The same procedures as mentioned in Example 6 were carried out, with the following exceptions.

The molar ratio 2,6-NDC/TPC was 20:80.

The polymerization mixture was prepared by dissolving 21.5637 parts by weight of 3,3'-DCB, 18.4238 parts by weight of PPDA, 34.1148 parts by weight of 3,4'-DAPE in 1891.3 parts by weight of NMP, and then supplementing the resultant solution with 10.7801 parts by weight of 2,6-NDC and 77.8278 parts by weight of TPC.

The same neutralizing slurry as mentioned in Example 1 was used in an amount of 140.252 parts by weight.

In the resultant dope solution, the polymer exhibited an intrinsic viscosity of 4.03. The dope solution had a solution viscosity of 3000 poises at a temperature of 100° C. In the drawing operation, the second drawing temperature and the total draw ratio were as shown in Table 7.

The properties of the resultant filaments were as indicated in Table 7.

TABLE 7
(Example 7)

| Run No. | Polymerized components (molar %) | | | | | Intrinsic viscosity | Second drawing temperature (°C.) | Total draw ratio | Filament | | | |
|---|---|---|---|---|---|---|---|---|---|---|---|---|
| | Diamine compound | | | Dicarboxylic acid compound | | | | | Denier | Tensile strength (g/d) | Ultimate elongation (%) | Young's modulus (g/d) |
| | 3,3'-DCB | PPDA | 3,4'-DAPE | 2,6-NDC | TPC | | | | | | | |
| 19 | 20 | 40 | 40 | 10 | 90 | 4.03 | 420 | 11.5 | 67 | 25.7 | 4.0 | 650 |
| 20 | 20 | 40 | 40 | 10 | 90 | 4.03 | 440 | 12.8 | 27 | 26.2 | 3.9 | 690 |
| 21 | 20 | 40 | 40 | 10 | 90 | 4.03 | 460 | 14.5 | 52 | 23.1 | 3.8 | 670 |

EXAMPLE 8

(3,3'-DCB/PPDA/3,4-DAPE=50/40/10, 2,6-NDC/TPC=5/95

The same procedures as mentioned in Example 1 were carried out, with the following exceptions.

The molar ratio of 2,6-NDC to TPC was 5:95.

The polymerization mixture was prepared by dissolving 29.8910 parts by weight of 3,3'-DCB, 12.1809 parts by weight of PPDA, 5.6388 parts by weight of 3,4'-DAPE in 1928.14 parts by weight of NMP, and then supplementing the resultant solution with 3.5637 parts by weight of 2,6-NDC and 54.3147 parts by weight of TPC.

The same neutralizing slurry as mentioned in Example 1 was used in an amount of 92.7279 parts by weight.

In the resultant dope solution, the polymer exhibited an intrinsic viscosity of 6.10. The dope solution had a solution viscosity of 4720 poises at a temperature of 100° C.

In the drawing operation, the second drawing temperature was 460° C., and the total draw ratio was 12.8.

The resultant filaments had a denier of 52, a tensile strength of 26.5 g/d, an ultimate elongation of 3%, and a Young's modulus of 960 g/d.

EXAMPLE 9

(3,3'-DMB/PPDA/3,4-DAPE=40/30/30, 2,6-NDC/TPC=1/99.

The same procedures as mentioned in Example 1 were carried out, with the following exceptions.

The molar ratio 2,6-NDC/TPC was 1/99.

The polymerization mixture was prepared by dissolving 36.2960 parts by weight of 3,3'-DMB, 13.8665 parts by weight of PPDA, 25.6763 parts by weight of 3,4'-DAPE in 1890.92 parts by weight of NMP, and then supplementing the resultant solution with 1.0818 parts by weight of 2,6-NDC and 85.9124 parts by weight of TPC. The polymerization reaction was carried out at room temperature for 4 hours, and then at a temperature of 80° C. for one hour.

The same neutralizing slurry as mentioned in Example 1 was used in an amount of 140.746 parts by weight.

In the resultant dope solution, the polymer exhibited an intrinsic viscosity of 4.39.

In the drawing operation, the second drawing temperature was 520° C. and the total draw ratio was 16.4.

The polymerization mixture was prepared by dissolving 48.633 parts by weight of 3,3'-DCB, 12.022 parts by weight of PPDA, 22.262 parts by weight of 3,4'-DAPE in 3602.4 parts by weight of NMP, and then supplementing the resultant solution with 86.918 parts by weight of 2,6-NDC and 69.741 parts by weight of TPC.

The same neutralizing slurry as mentioned in Example 1 was used in an amount of 218.4 parts by weight.

In the resultant dope solution, the polymer exhibited an intrinsic viscosity of 4.38.

In the drawing operation, the second drawing temperature was 280° C. and the total draw ratio was 10.4.

The resultant filaments had a denier of 32, a tensile strength of 26.9 g/d, an ultimate elongation of 4.3% and a Young's modulus of 760 g/d.

COMPARATIVE EXAMPLES 1 TO 6

The same procedures as mentioned in Example 1 were carried out, under the conditions indicated in Table 8.

The results are shown in Table 8.

Due to the lack of 2,6-NDC, the resultant drawn filaments had an unsatisfactory tensile strength and ultimate elongation.

TABLE 8

(Comparative Examples 1 to 6)

| Comparative Example No. | Polymerized components (molar %) | | | | | | Intrinsic viscosity | Second drawing temperature (°C.) | Total draw ratio | Filament | | | |
|---|---|---|---|---|---|---|---|---|---|---|---|---|---|
| | Diamine compound | | | | Dicarboxylic acid compound | | | | | Denier | Tensile strength (g/d) | Ultimate elongation (%) | Young's modulus (g/d) |
| | 3,3'-DMB | 3,3'-DCB | PPDA | 3,4'-DAPE | 2,6-NDC | TPC | | | | | | | |
| 1 | 40 | 0 | 30 | 30 | 0 | 100 | 4.81 | 520 | 12.8 | 35 | 27.4 | 3.0 | 970 |
| 2 | 60 | 0 | 20 | 20 | 0 | 100 | 5.46 | 520 | 8.5 | 53 | 23.6 | 2.4 | 980 |
| 3 | 20 | 0 | 40 | 40 | 0 | 100 | 3.78 | 520 | 22.4 | 20 | 25.2 | 3.1 | 890 |
| 4 | 50 | 0 | 40 | 10 | 0 | 100 | 6.11 | 520 | 7.3 | 27 | 23.1 | 2.6 | 926 |
| 5 | 0 | 40 | 30 | 30 | 0 | 100 | 2.30 | 460 | 22.0 | 29 | 12.5 | 2.0 | 790 |
| 6 | 0 | 20 | 40 | 40 | 0 | 100 | 3.48 | 520 | 9.5 | 43 | 23.0 | 2.6 | 620 |

The resultant filaments had a denier of 37, a tensile strength of 28.6 g/d, an ultimate elongation of 4.0% and a Young's modulus of 780 g/d.

EXAMPLE 10

(3,3'-DCB/PPDA/3,4-DAPE=40/30/30, 2,6-NDC/TPC=50/50.

The same procedures as mentioned in Example 4 were carried out, with the following exceptions.

The molar ratio 2,6-NDC/TPC was 50/50.

COMPARATIVE EXAMPLES 7 TO 12

The same procedures as mentioned in Example 1 were carried out, under the conditions indicated in Table 9.

The results are shown in Table 9.

TABLE 9

(Comparative Example 7 to 12)

| Comparative Example No. | Polymerized components (molar %) | | | | | Intrinsic viscosity | Second drawing temperature (°C.) | Total draw ratio | Filament | | | |
|---|---|---|---|---|---|---|---|---|---|---|---|---|
| | Diamine compound | | | Dicarboxylic acid compound | | | | | Denier | Tensile strength (g/d) | Ultimate elongation (%) | Young's modulus (g/d) |
| | 3,3'-DMB | PPDA | 3,4'-DAPE | 2,6-NDC | TPC | | | | | | | |
| 7 | 0 | 50 | 50 | 0 | 100 | 3.40 | 520 | 15.0 | 36 | 23.0 | 3.5 | 630 |
| 8 | 50 | 0 | 50 | 100 | 0 | 2.93 | In coagulating step, the filaments became opaque. The dope solution had a poor fiber forming property. | | | | | |
| 9 | 40 | 20 | 40 | 100 | 0 | 3.20 | In coagulating step, the filaments became opaque. The dope solution had a poor fiber forming property. | | | | | |
| 10 | 50 | 50 | 0 | 0 | 100 | | In polymerization step, the polymerization mixture became opaque. The intrinsic viscosity was not increased. | | | | | |
| 11 | 50 | 50 | 0 | 100 | 0 | | In polymerization step, the polymerization mixture became opaque. The intrinsic viscosity was not increased. | | | | | |
| 12 | 100 | 0 | 0 | 20 | 80 | | The resultant dope solution was not isotropic and had a soap solution-like appearance. | | | | | |

We claim:

1. A wholly aromatic polyamide consisting essentially of (A) recurring aromatic dicarbonyl units of the formula (Ia) and (Ib):

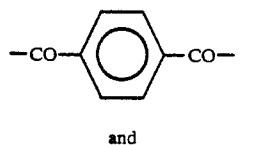 (Ia)

and

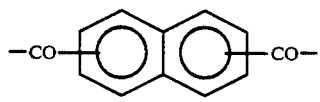 (Ib)

and (B) recurring aromatic diamine units of the formulae (IIa), (IIb) and (IIc):

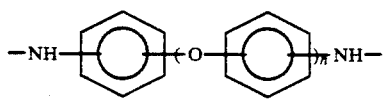 (IIa)

 (IIb)

and

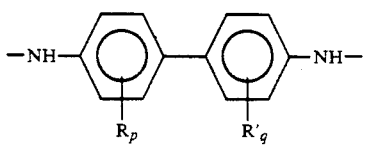 (IIc)

in which formulae, R and R' respectively represent, independently from each other, a member selected from the group consisting of halogen atoms, halogen atoms, alkyl groups and alkoxyl groups, n represents a positive integer of 1 to 3, and p and q respectively represent, independently from each other, a positive integer of 1 to 4, the recurring units of the formulae (Ia) and (Ib) being in the molar amounts satisfying the following relationship:

$$0.001 \leq (M_{Ib})/[(M_{Ia}) + (M_{Ib})] \leq 0.7$$

wherein $(M_{Ia})$ and $(M_{Ib})$ represent the molar amounts of the recurring units of the formulae (Ia) and (Ib).

2. The wholly aromatic polyamide as claimed in claim 1, wherein the recurring aromatic dicarbonyl units of the formula (Ib) are selected from those of the formulae (Ib-1), (Ib-2) and (Ib-3)

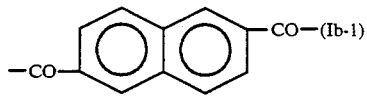 (Ib-1)

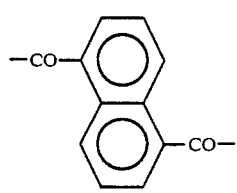 (Ib-2)

and

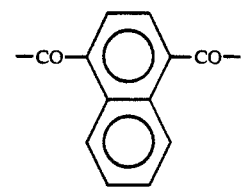 (Ib-3)

3. The wholly aromatic polyamide as claimed in claim 1, wherein the recurring aromatic diamine units of the formula (IIa) are selected from those of the formulae (IIa-1), (IIa-2), (IIa-3) and (IIa-4):

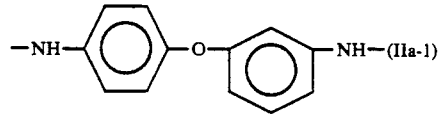 (IIa-1)

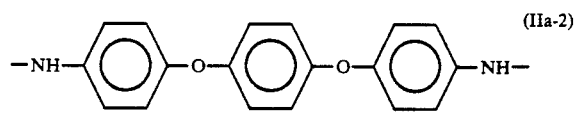 (IIa-2)

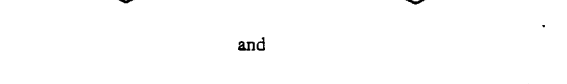 (IIa-3)

and

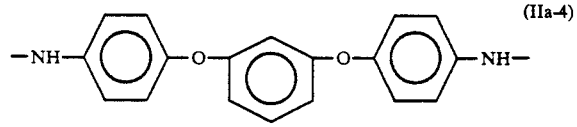 (IIa-4)

4. The wholly aromatic polyamide as claimed in claim 1, wherein the recurring aromatic dicarbonyl units are those of the formulae (Ia) and (Ib-1):

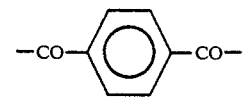 (Ia)

and

 (Ib-1)

and the recurring aromatic diamine units are those of the formulae (IIa-1) (IIb) and (IIc-1):

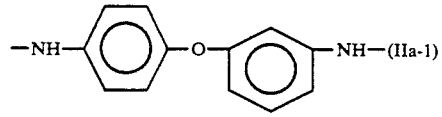 (IIa-1)

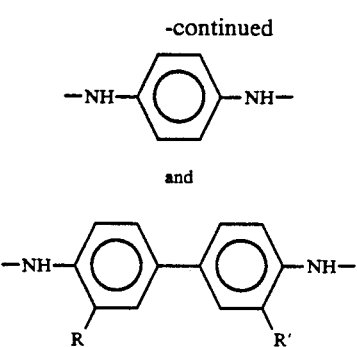

(IIb)

and (IIc-1)

wherein R and R' are same as each other and respectively represent a member selected from the group consisting of halogen atoms and alkyl radicals, and the recurring units of the formulae (Ia) and (Ib-1) are in the molar amounts satisfying the following relationship:

$$0.0123 \leq (M_{Ib\text{-}1})/[(M_{Ia})+(M_{Ib\text{-}1})] \leq 0.6$$

wherein $(M_{Ia})$ is as defined above and $(M_{Ib\text{-}1})$ represents a molar amount of the recurring units of the formula (Ib-1).

5. A wholly aromatic polyamide resinous material comprising a blend of at least two wholly aromatic polyamides as claimed in any of claims 1 to 4 with each other.

6. An isotropic dope solution comprising at least one wholly aromatic polyamide as claimed in any of claims 1 to 4, dissolved in an organic solvent.

7. A shaped article comprising at least one wholly aromatic polyamide as claimed in any of claims 1 to 4.

* * * * *